May 8, 1956 S. R. J. STOKVIS ET AL 2,744,758
ROLLER DEVICE FOR MOVING LOADS
Filed April 28, 1953 2 Sheets-Sheet 1
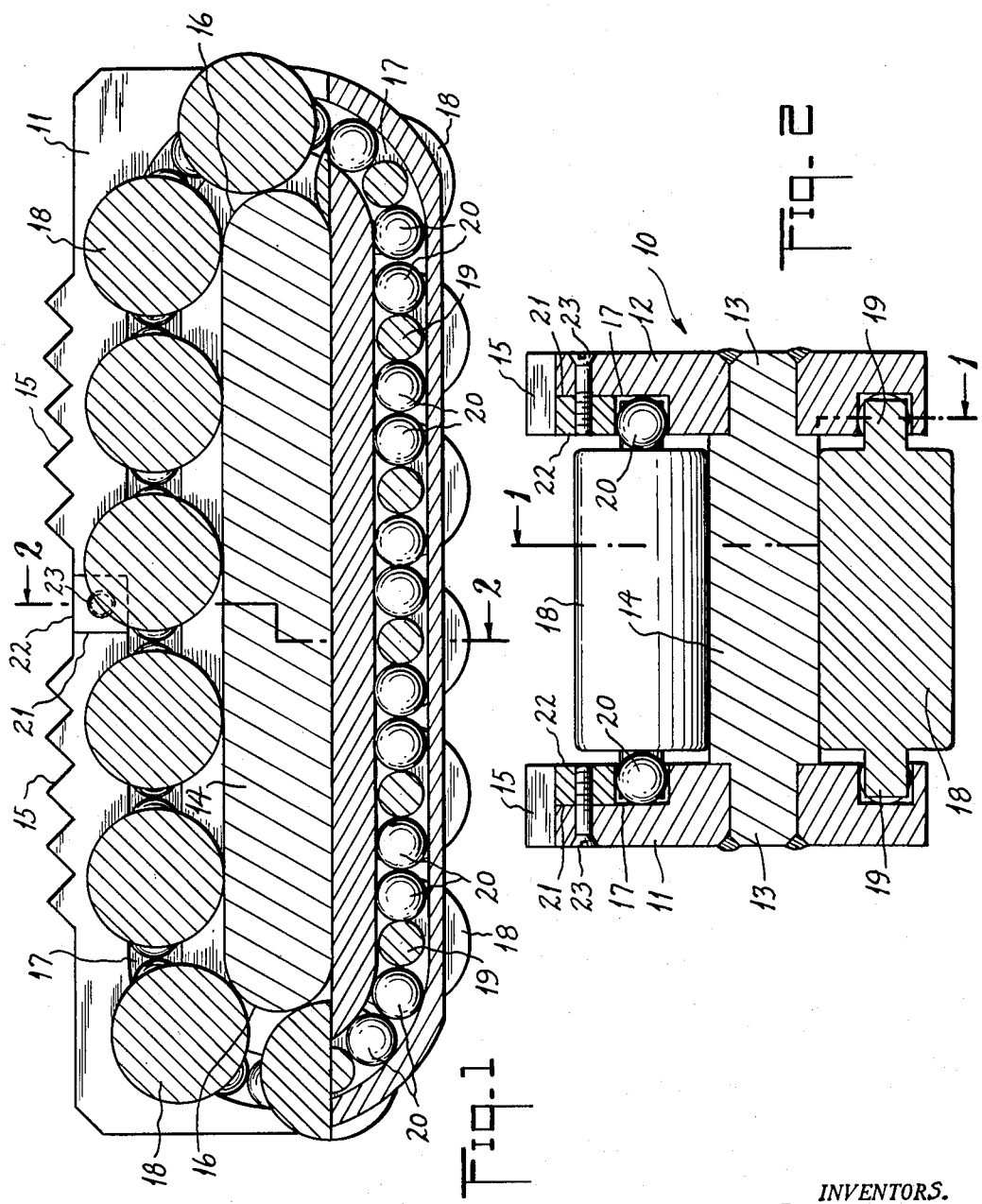
INVENTORS.
S. R. JOHN STOKVIS
EUGENE EDERA
BY
ATTORNEYS May 8, 1956  S. R. J. STOKVIS ET AL  2,744,758
ROLLER DEVICE FOR MOVING LOADS
Filed April 28, 1953  2 Sheets-Sheet 2

INVENTORS.
S.R. JOHN STOKVIS
EUGENE EDERA
BY
ATTORNEYS

United States Patent Office 2,744,758
Patented May 8, 1956

2,744,758

ROLLER DEVICE FOR MOVING LOADS

Samuel Raphael John Stokvis and Eugene Edera,
Great Neck, N. Y.

Application April 28, 1953, Serial No. 351,626

8 Claims. (Cl. 280—1)

This invention relates to dollies for moving heavy articles over short distances along a floor or other surface, and has particular reference to a dolly which is capable of traversing irregular surfaces without substantial interruption in its progress, even though heavily loaded.

Numerous dollies of the endless track type have been devised, and some are in use, but by reason of link or chain connections between the tracks or treads as they move around their endless course, lateral movements and unbalanced forces cause excessive loads to be applied to these track connections, and they eventually break. Also, such track connections frequently drag on the frame and associated parts of the dolly, thereby increasing friction and requiring greater force to move the load on the dolly, and also leading to eventual breakage.

In accordance with the present invention, a dolly of the generally endless track type is provided which has few parts, is exceptionally strong and rugged so as to withstand unusually heavy loads and lateral movements without impairment, and which is simple and inexpensive to manufacture.

In a preferred embodiment of the invention, the frame of the dolly is generally H-shaped in transverse vertical section with an elongated center bar of flat shape serving as the load-supporting platform over which the rollers move in their endless course above, below and around the ends thereof. The rollers have an axial length slightly less than the distance between the side members of the H-frame and have axial end extensions which move in endless slots in the inner surfaces of the side members, between spacing and bearing balls rolling in the slots. The bearing balls not only uniformly space the rollers apart by spacing their axial extensions in the manner described, but the balls also space the ends of the rollers from the corresponding inner surfaces of the side members of the H-frame.

As the dolly is moved along the floor or other surface, the rollers roll thereon and also roll on the undersurface of the horizontal platform while the balls travel in their slots, and then the rollers round the ends of the horizontal platform to reverse their direction and roll along the upper surface thereof to complete the endless cycle. The rollers project below the frame side members, which in turn project above the rollers and are preferably serrated to frictionally hold the article to be moved by the dolly. Alternatively, the dolly may be inverted, so that the rollers project above the side members of the frame, so that heavy articles may be rolled therealong from one point to another, with several dollies placed on the floor in aligned sequence for that purpose.

It will be seen that the dolly of this invention is simple in construction and operation, and by reason of the bearing balls interposed between the bottoms of the side member slots and the adjacent ends of the rollers, both the rollers and the side members of the frame are substantially rigidly braced against each other against lateral turning strains and heavy loads which tend to spread the side members of the frame apart.

For a more complete understanding of the invention, reference is had to the accompanying drawings, in which:

Figure 1 is a vertical section through the dolly of this invention as seen along the line 1—1 of Fig. 2;

Fig. 2 is a transverse vertical section through the dolly of this invention as seen along the line 2—2 of Fig. 1.

Figure 3:
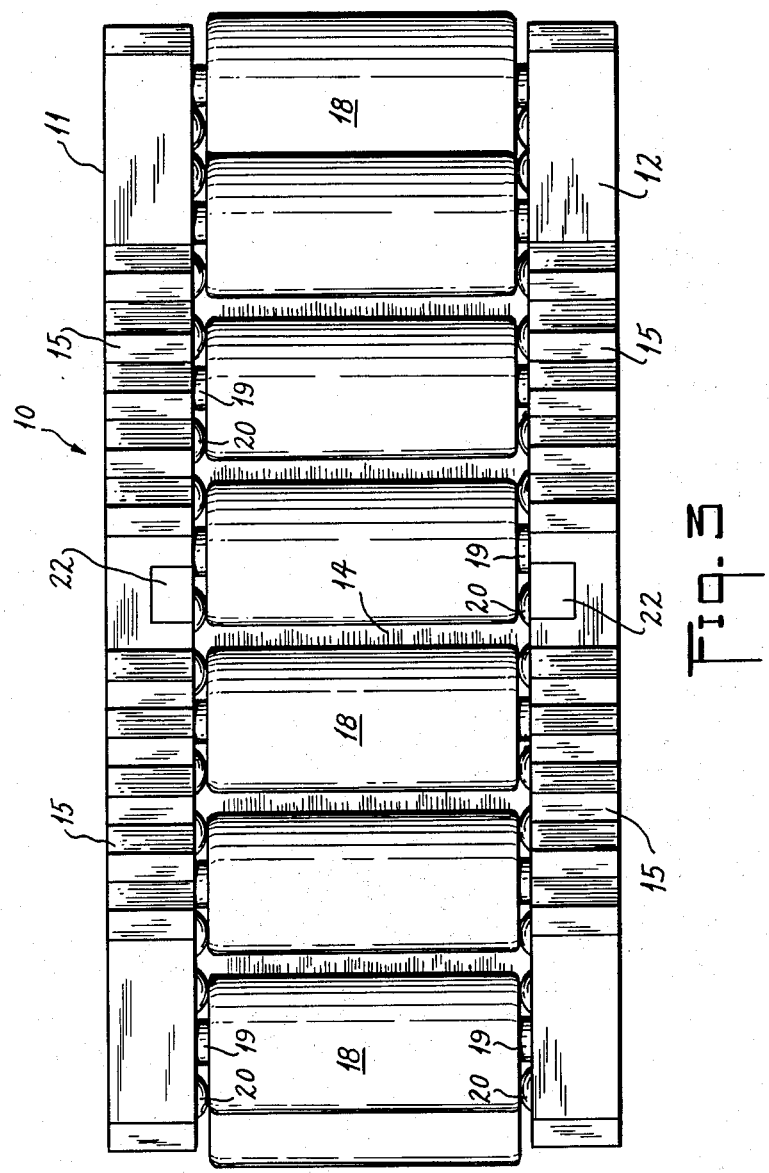
Fig. 3 is a plan view thereof.

Referring to the drawings, numeral 10 generally designates the frame of the dolly and comprises two elongated side members 11 and 12 of rigid and strong material, preferably steel, which are mortised longitudinally at a point below their horizontal mid-section for the reception of the reduced ends or tenons 13 of the horizontal platform 14. When tenons 13 of the horizontal platform are inserted in the mortises of the side members 11 and 12 and welded in place as shown in Fig. 2, a strong, rigid frame 10 of H-shaped cross-section is formed.

As shown especially in Figs. 1 and 2, the upper edges of the side members 11 and 12 project a substantially greater distance above the horizontal platform 14 than they do below the lower edges of the latter, and the upper edges of the side members 11 and 12 are serrated at 15 to provide the friction supporting surfaces for assisting gravity in holding in place the article supported and to be moved by the dolly.

As shown especially in Fig. 1, the horizontal platform 14 is of substantial width longitudinally of the side members 11 and 12 and its ends 16 are rounded with a curvature having a radius substantially equal to one-half the thickness of the cross-bar.

The inner surfaces of both side members 11 and 12 are provided with matching endless slots 17 having the contour of and being spaced uniformly from the external surface of the horizontal platform 14 with the centers of curvature of the ends of slots 17 coincident with the center of curvature of the ends 16 of the horizontal platform 14, as is shown especially in Fig. 1.

Positioned at spaced intervals between the side members 11 and 12 and engaging horizontal platform 14 are transverse rollers 18 having a diameter substantially equal to twice the distance between the center lines of slots 17, and the corresponding surface of the horizontal cross-bar 14.

Extending axially from each end of each roller 18 are axle-like extensions or pins 19, having a diameter less than the width of the corresponding slot 17 and an axial length such that the ends of the extensions 19 are spaced from the bottoms of the corresponding slot 17, i. e., an overall axial length of the roller 18, including their extensions 19, is less than the space between the bottoms of the opposite slots 17. Accordingly, as the rollers 18 roll over the upper and lower surfaces and around the ends 16 of horizontal platform 14, the axial extensions 19 of the rollers 18 travel in the corresponding slots 17, but do not touch the inner walls or the bottoms thereof.

Interposed between the axial extensions 19 of adjacent rollers are balls 20 which are preferably commercial bearing balls of hardened polished steel, and which have a diameter slightly less than the width of the slots 17, so as to roll freely therein, but to have little lateral play therein. Also, the balls 20 are of such diameter that they space the extensions 19 of adjacent rollers with little transverse play. As shown particularly in Fig. 1, two balls 20 are interposed between the axial extensions 19 of adjacent rollers 18 to space them apart. More than two balls 20 may be used, depending on requirements, but less friction is encountered if at least two balls are used, rather than one, although good results are obtained with one ball of large diameter sufficient to space the rollers 18 apart. Also, the peripheral dimensions of the slots 17, taken with the diameters of the axial extensions 19 of rollers 18, and the diameters of the spacing balls 20 is such that the rollers 18 may move freely with little friction and backlash under, over, and around the horizontal platform 14 in the manner described.

As shown particularly in Figs. 2 and 3, the depth of the slots 17 is less than the diameter of the spacing balls 20, so that the latter project inwardly at each side to engage the flat ends of the rollers 18. Accordingly, the balls 20 serve the additional purpose of centering rollers 18 laterally by spacing them endwise from the corresponding side members 11 and 12. The clearance between balls 20 and the flat ends of the rollers is only sufficient to afford rolling of the balls 20 over the flat ends of the rollers 18, so that the side members 11 and 12 and the rollers 18 are mutually braced laterally against each other, whereby the rollers 18 are relatively immovable in a lateral direction, although they are freely movable in a longitudinal direction relatively to the side members 11 and 12 as they roll over the horizontal platform 14.

The side members 11 and 12 are provided with opposite grooves 21 leading to the corresponding slots 17 and normally are closed by plugs 22, each held in place by a tap screw 23. When the plug 22 is removed, the extensions 19 of the rollers 18 may be dropped through these grooves 21 into the corresponding slots 17 and then two balls 20 dropped through each of the grooves 21 followed by the extensions 19 of the next roller 18. This is repeated until the full complement of rollers 18 and spacing balls 20 have been loaded into slots 17, whereupon the plugs 22 are replaced, thereby sealing the balls 20 in the slots 17 to hold the rollers 18 in proper spaced relation.

Operation of the dolly of this invention will be readily understood from the foregoing description, and it will be observed therefore, that as the dolly is rolled along the floor or other surface, the rollers 18 roll first along the under surface of the horizontal platform 14, then around the trailing end 16 thereof to roll forwardly along the upper surface of platform 14 and around the leading end 16 thereof to repeat the cycle. Meanwhile, the rollers 18 are spaced endwise from and simultaneously brace the side corresponding members 11 and 12 through the intermediary of balls 20 as they roll continuously around in the slots 17. Because of this lateral bracing of the side members 11 and 12, the usual tendency of dolly side frames to spread apart at the top and converge at the bottom is precluded.

With the use of the dolly of this invention, heavy articles, such as machine tools, and the like, placed on one or more dollies may be moved along the floor over cracks and irregularities without substantial impairment in their progress because of the endless track effect of the continuously moving rollers 18.

By reason of the simple and rugged construction and adaptability, the dolly may be inverted, and with its serrated edges 15 resting on the floor or other surface and heavy articles rolled along its then top surface which is formed by the rollers 18 projecting above the side members 11 and 12.

Although a preferred embodiment of the invention has been illustrated and described herein, it is to be understood that the invention is not limited thereby, but is susceptible of changes in form and detail within the scope of the appended claims.

We claim:

1. In a dolly for transporting an article over a surface, the combination of a frame of substantially H-shaped cross-section formed of elongated side members and a horizontal platform extending between said side members and secured thereto, said side members each having an endless slot having the longitudinal contour of said platform and spaced uniformly therefrom, transverse rollers projecting below said side members and having axial end extensions guided in the slots in the corresponding side members, and a first and a second series of rolling elements seated respectively in said slots at opposite sides of said axial extensions of said rollers for spacing said axial extensions apart and guiding said rollers in sequence around said platform as the dolly is moved over said surface, said first and second series of rolling elements being mutually independent and sufficiently small in size to extend laterally no further than the adjacent ends of the rollers.

2. In a dolly for transporting an article over a surface, the combination of a frame of substantially H-shaped cross-section formed of elongated side members and a horizontal platform having parallel flat upper and lower faces and rounded ends extending between said side members and secured thereto, said side members each having an endless slot having the longitudinal contour of said platform and spaced uniformly therefrom, transverse rollers projecting below said side members and having axial end extensions guided in the slots in the corresponding side members, and balls seated in said slots at opposite sides of said axial extensions of said rollers and extending outwardly of the slot to engage the adjacent ends of the rollers for spacing said axial extensions apart and guiding said rollers in sequence around said platform as the dolly is moved over said surface.

3. In a dolly for transporting an article over a surface, the combination of a frame of substantially H-shaped cross-section formed of elongated side members and a horizontal platform extending between said side members and secured thereto, said side members each having an endless slot having the longitudinal contour of said platform and spaced uniformly therefrom, transverse rollers projecting below said side members and having axial end extensions guided in the slots in the corresponding side members, and balls seated in said slots at opposite sides of said axial extensions of said rollers and extending outwardly of the slot to engage the adjacent ends of the rollers for spacing said axial extensions apart and engaging the corresponding ends of said rollers for spacing them from the corresponding side members.

4. In a dolly for transporting an article over a surface, the combination of a frame of substantially H-shaped cross-section formed of elongated side members and a horizontal platform extending between said side members and secured thereto, said side members each having an endless slot having the longitudinal contour of said platform and spaced uniformly therefrom, transverse rollers projecting below said side members and having axial end extensions guided in the slots in the corresponding side members, and at least two balls interposed between the extensions of adjacent rollers and seated in the corresponding slots at each end thereof and having a diameter slightly more than the depth of the slot for engaging the corresponding end of the roller to space the latter from the corresponding side member as the rollers travel in sequence around said platform upon movement of the dolly over said surface.

5. In a dolly for transporting an article over a surface, the combination of a frame of substantially H-shaped cross-section formed of elongated side members and a horizontal platform extending between said side members and secured thereto, said side members each having an endless slot having the longitudinal contour of said platform and spaced uniformly therefrom, transverse rollers engaging the upper, lower and end faces of said platform and forming upper and lower horizontal courses of rollers, the lower course of said rollers projecting below said side members, axial end extensions on said rollers projecting into the slots in the corresponding side members, and balls seated in said slots at opposite sides of said axial extensions of said rollers and extending outwardly of the slot to engage the adjacent ends of the rollers for spacing said axial extensions apart and guiding said rollers in sequence around said platform as the dolly is moved over said surface.

6. In a dolly for transporting an article over a surface, the combination of a frame of substantially H-shaped cross-section formed of elongated side members and a horizontal platform extending between said side members and secured thereto, said side members each having an endless slot having the longitudinal contour of said platform and spaced uniformly therefrom, transverse rollers having axial end extensions guided in the slots in the corresponding side members, said rollers engaging the upper, lower and end faces of said platform and forming upper and lower courses of rollers, said lower course projecting below said side members, a first and a second series of mutually independent rolling elements seated respectively in said slots at opposite sides of said axial extensions of said rollers for spacing said axial extensions apart and guiding said rollers in sequence around said platform as the dolly is moved over said surface, said rolling elements being sufficiently small in size to extend laterally no further than the adjacent ends of the rollers, and upward extensions on the side members projecting above the upper course of said rollers for spacing the article clear of the upper course of said rollers.

7. In a dolly for supporting heavy loads, the combination of substantially rectangular side members, an elongated horizontal platform extending between said side members and forming therewith a substantially H-shaped frame, said side members having like endless slots facing each other across said horizontal platform and having the contour of the latter and spaced uniformly therefrom, transverse rollers engaging the upper, lower and end faces of said horizontal platform and forming upper and lower horizontal courses of rollers, one horizontal course of said rollers projecting beyond the corresponding horizontal edges of said side walls and the opposite horizontal edges of said side walls projecting beyond the other horizontal course of said rollers, axial extensions on opposite ends of said rollers and projecting into the corresponding slots, and balls interposed between the bottoms of the slots and the corresponding ends of the rollers and between the axial extensions of adjacent rollers in said slots, said balls also extending outwardly of the slot to engage the adjacent ends of the rollers for axially and transversely spacing said rollers and guiding them in their travel around the upper, lower and end faces of said platform.

8. In a dolly for supporting heavy loads, the combination of substantially rectangular side members, an elongated horizontal platform extending between said side members and forming therewith a substantially H-shaped frame, said side members having like endless slots facing each other across said horizontal platform and having the contour of the latter and spaced uniformly therefrom, transverse rollers engaging the upper, lower and end faces of said horizontal platform and forming upper and lower horizontal courses of rollers, one horizontal course of said rollers projecting beyond the corresponding horizontal edges of said side walls and the opposite horizontal edges of said side walls projecting beyond the other horizontal course of said rollers, axial extensions on opposite ends of said rollers and projecting into the corresponding slots, balls interposed between the bottoms of the slots and the corresponding ends of the rollers and between the axial extensions of adjacent rollers in said slots, said balls also extending outwardly of the slot to engage the adjacent ends of the rollers for axially and transversely spacing said rollers and guiding them in their travel around the upper, lower and end faces of said platform, each side member having a groove leading inwardly to the corresponding slot for inserting the axial extensions and balls thereinto, and a removable plug normally closing each said groove to seal the balls and extensions therein.

References Cited in the file of this patent

UNITED STATES PATENTS

| 399,248 | Deming | Mar. 12, 1889 |
| 1,038,514 | Anderson | Sept. 17, 1912 |
| 1,320,331 | Johnson | Oct. 28, 1919 |
| 2,593,089 | Barry | Apr. 15, 1952 |
| 2,644,691 | Pohle | July 7, 1953 |

FOREIGN PATENTS

| 835 | Great Britain | Apr. 30, 1875 |
| 32,510 | Switzerland | Dec. 2, 1904 |